2,909,406

PROCESS FOR DECONTAMINATING THORIUM AND URANIUM WITH RESPECT TO RUTHENIUM

Albert B. Meservey, Oak Ridge, and Robert H. Rainey, Knoxville, Tenn., assignors to the United States of America as represented by the United States Atomic Energy Commission No Drawing. Application May 20, 1958
Serial No. 736,648

6 Claims. (Cl. 23—14.5)

Our invention relates to the processing of fissionable and fertile material and more particularly to an improvement in decontaminating thorium and uranium values with respect to ruthenium.

A major factor in the cost of generating electricity from nuclear fission is the cost of the fuel. One method of reducing the operating cost of a power-producing nuclear reactor is to obtain fissionable material as a by-product by means of neutron irradiation of fertile thorium 232 or uranium 238. The value of the fissionable material thus produced may then be credited to the operation of the reactor.

In the case of thorium 232, neutron irradiation produces fissionable uranium 233 by the following decay chain:

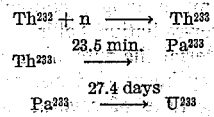

Thorium may be subjected to neutron irradiation in various types of reactors. For example, thorium metal may be inserted as aluminum-encased slugs into a heterogeneous reactor, or slurries of thorium oxide may be utilized in one-region or two-region homogeneous reactors. In the one-region reactor a homogeneous slurry of thorium oxide and fissionable uranium oxide is circulated through a single reactor vessel. In one type of two-region reactor a solution of fissionable uranium, for example, a solution of uranyl sulfate enriched with respect to uranium 235, is circulated through a central reactor core, and a thorium oxide slurry is circulated through a blanket surrounding the core.

The neutron-irradiated thorium thus obtained contains protactinium and uranium 233 resulting from decay of the thorium and, in addition, small amounts of highly radioactive fission products. Uranium and thorium may be separately recovered from neutron-irradiated thorium by means of a solvent extraction process, described in a co-pending application S.N. 602,686, filed August 7, 1956, entitled "Process for the Separation of Protactinium, Thorium and Uranium from Neutron-Irradiated Thorium," by A. T. Gresky et al. In this process neutron-irradiated thorium in the form of thorium metal or thorium oxide is dissolved in nitric acid and the resulting solution is adjusted to a nitrate ion deficiency. The nitrate ion deficient feed solution is contacted with tributylphosphate in a diluent to extract the thorium and uranium; the protactinium and fission products remain in the aqueous phase. The organic phase is then scrubbed with an aluminum nitrate solution for further decontamination of the thorium and uranium. Thorium and uranium are selectively stripped from the organic phase and recovered separately, the thorium being recovered by evaporation of the strip solution and the uranium being recovered by ion-exchange isolation and elution. A net nitrate ion deficiency is maintained in the acid feed solution and the scrub solution to obtain more effective decontamination.

As understood in this specification and the appended claims, nitrate ion deficiency is a relative term to indicate that a solution of a nitrate salt of a metal of a given molarity will not register as high an acidity as a solution of the normal nitrate salt of the same metal molarity, or in other words, this is a measure of a stoichiometric deficiency of nitrate ion, which stoichiometric deficiency is made up by hydroxyl ions supplied through hydrolysis. Nitrate ion deficiency in the nitric acid feed solution may be obtained by boiling off a portion of the solution to remove nitric acid and oxides of nitrogen or by the addition of a basic aluminum nitrate salt, such as dibasic aluminum nitrate. This condition is also maintained in the aluminum nitrate scrub solution by employing a basic aluminum nitrate salt.

One of the problems in this process is the tendency of the highly radioactive fission product ruthenium to be extracted into the organic phase along with thorium and uranium rather than to remain in the aqueous phase as desired. The resulting ruthenium contamination of the thorium and uranium products has been a limiting factor in the processing of neutron-irradiated thorium.

Because of the difficulty with ruthenium decontamination and other factors, such as the high level of radioactivity of other fission products, neutron-irradiated thorium processing in the past has been restricted to "long-decayed" material, that is, material which has been removed from a nuclear reactor and stored for a period of at least 180 days. This long decay period has the advantages that the radioactivity level in the process is greatly reduced and that protactinium 233 has largely decayed to the desired product, uranium 233. However, processing of "short-decayed" material, that is, material which has been removed from a nuclear reactor for only 20 to 40 days, is more desirable because of the minimized inventory of unprocessed $U^{233}$, and the decreased thorium 228 activity in the product thorium. In the processing of short-decayed material the aqueous phase containing protactinium and fission products is stored to allow the protactinium to decay to $U^{233}$, which is subsequently recovered. The $U^{233}$ thus recovered exhibits a high level of isotopic purity.

Various measures have been employed to improve the separation of ruthenium from thorium and uranium. The provision of a nitrate ion deficiency as described above was devised largely to prevent the extraction of protactinium and ruthenium into the organic phase. While the nitrate ion deficiency has been successful in preventing the extraction of protactinium, excessive amounts of ruthenium activity were still being extracted, particularly in the processing of short-cooled material.

Another method of controlling ruthenium extraction is by digesting the feed with a ketone and nitrite ions in a highly acidified system before the solvent extraction, as described in co-pending application S.N. 561,962, filed January 27, 1956, by A. T. Gresky and entitled "Improved Ruthenium Decontamination Method." This method, however, is inapplicable to a nitrate ion deficient system, which is preferred for processing neutron-irradiated thorium.

Other objects and advantages of our invention will be apparent from the following detailed description.

In accordance with our invention improved decontamination of thorium and uranium with respect to ruthenium may be obtained in the organic solvent extraction of a nitrate solution containing thorium, uranium, protactinium and fission products by providing in the nitrate feed solution ions selected from the group consisting of sulfite ions and bisulfite ions. Our process is especially advantageous in the solvent extraction of thorium from solutions under nitrate-deficient conditions as employed in the process of Gresky et al., referred to above, but is also advantageous in the extraction of thorium from weakly acidic nitrate solutions, i.e., those containing not substantially more than 0.5 N free nitric acid. Highly improved ruthenium decontamination is obtained by this method, which is particularly advantageous in the case of short-decayed, neutron-irradiated thorium. Ruthenium decontamination is improved to such an extent that this element is no longer a limiting factor in the processing of short-decayed material.

The mechanism by which sulfite and bisulfite ions render ruthenium organic-insoluble in a nitrate ion deficient solution is not known. Some evidence had indicated that the organic solubility of organic ruthenium was due to the formation of a soluble complex of ruthenium with nitrite ions which were formed in the solution by irradiation of nitrate ions. For example, it had been found that with non-radioactive materials, the presence of nitrite ions renders ruthenium organic-soluble in a nitrate ion deficient solution, and that the addition of a nitrite-destroying agent such as a sulfamate or a peroxide restored the ruthenium to its former organic-insoluble condition. However, we have found that upon allowing such a nitrite-containing solution to stand for a period of several days, or under radiation conditions, agents such as sulfamates and peroxides are ineffective and only sulfite and bisulfite ions are effective in rendering the ruthenium organic-insoluble. The organic solubility of ruthenium in the processing of neutron-irradiated thorium thus probably results from radiation effects other than nitrite formation in the feed solution.

Both sulfite and bisulfite ions are effective in our invention and their source is not critical. These ions may be supplied conveniently from their sodium salts, i.e., sodium bisulfite and sodium sulfite. We prefer to employ sodium bisulfite in view of its somewhat higher effectiveness. Any other soluble sulfite or bisulfite may be employed, provided that its cation does not adversely affect the extraction process. A suitable ion concentration may also be obtained by introducing gaseous sulfur dioxide into the aqueous feed solution.

In order to render the ruthenium organic-insoluble, the sulfite or bisulfite must be maintained in contact with the feed solution for a period of time sufficient to allow a reaction between the ruthenium and sulfite or bisulfite to take place before the feed solution is contacted with the organic extractant. This contact time varies with the temperature, with less time being required at higher temperatures.

The temperature at which the sulfite or bisulfite is contacted with the feed solution is important, particularly in the case of short-decayed material. Because sulfite and bisulfite ions are gradually destroyed by a reaction with degradation products resulting from the high level of radioactivity of short-decayed material, it is desirable to keep the contact time to a minimum in order to avoid a complete loss of sulfite or bisulfite. Since shorter contacting times are required at higher temperatures, the highest possible contacting temperature is preferred. However, as the temperature is increased, a point, which may vary with the particular feed solution being processed, is reached at which the sulfite or bisulfite ions are completely and rapidly destroyed by reacting with the nitric acid of hydrolysis. This temperature is generally within the range of 60° C. to 90° C. for the feed solutions presently employed in the processing of neutron-irradiated thorium, that is, solutions constituted of approximately 7 to 8 M nitrate, 1.0 to 2.0 M thorium, 0.4 to 0.6 M aluminum, uranium at a ratio of up to approximately 4000 grams per ton of thorium and smaller quantities of protactinium and fission products, with a nitrate ion deficiency in the solution with the range of 0.1 to 0.2 N. The decomposition temperature depends primarily on the nitrate ion deficiency of the solution and the concentration of the various constituents, the temperature being decreased with an increase in concentration and with a decrease in the nitrate ion deficiency. Since a more exact relationship for determining the critical temperature is not known, we prefer to conduct an empirical test for the particular feed solution involved and to employ a contacting temperature at a safe margin of 5° C. to 10° C. below the critical temperature in order to avoid destroying the sulfite or bisulfite and at the same time to obtain relatively high decontamination in the subsequent extraction step.

The temperature at which sulfite or bisulfite is destroyed in the feed solution may be determined by withdrawing a sample of the solution, adding 0.006 M sulfite or bisulfite ion, if not already present, and heating slowly. As the temperature increases, portions of the sample are withdrawn at regular temperature intervals, such as at every 3° C. above 55° C. Each portion is then tested for the presence of sulfite or bisulfite by adding a soluble starch solution and titrating with 0.01 M iodine solution. At some definite temperature the sulfite or bisulfite disappears from the solution, as shown by the appearance of the characteristic starch-iodine blue color upon addition of iodine.

At contacting temperatures of 70° C. and above a contacting time of 5 minutes is sufficient to allow the reaction of ruthenium and sulfite or bisulfite. At 65° C. approximately 7 minutes is required, 10 minutes at 60° C., 15 minutes at 55° C. and 20 minutes at 50° C.

Although a short contacting time is important to avoid loss of sulfite or bisulfite in highly radioactive short-decayed material, much longer contacting times may be employed in lower-radiation fields. Thus in the case of long-decayed material the ruthenium and sulfite or bisulfite contacting may be carried out at room temperature, with a contacting time of several days being required. The sulfite or bisulfite are less likely to be destroyed by reaction with radiation degradation products, since the level of radiation is appreciably lower. However, in view of the shorter time required and the more effective decontamination obtained, it is preferred to perform this contacting at a temperature slightly below the decomposition temperature, at which sulfite or bisulfite is destroyed in the solution, with the same principles for determining the contacting time and temperature applying as for short-decayed material.

Contacting of the sulfite or bisulfite with the feed solution may be performed readily in a continuous column operation by continuously introducing the sulfite or bisulfite into the feed stream and allowing the feed to be held up in a container, such as a conventional hold-up tank, for the time required and at the prescribed temperature. The feed is withdrawn continuously into the solvent extraction columns from the hold-up tank. Any additional apparatus, such as hold-up tanks, required by the present process should, of course, be provided with radiation shielding as is done in the case of the remaining extraction apparatus.

The concentration of sulfite or bisulfite to be employed varies with the type of material being processed. In the processing of long-decayed material, slightly improved ruthenium decontamination is obtained at concentrations as low as 0.001 M. However, for practically effective decontamination a concentration within the range of 0.01 to 0.2 M is required, and a concentration within the range of 0.02 to 0.03 M is preferred. These relatively low concentrations are preferred since the excess sulfite or bisulfite is eventually converted to sulfate, which has the effect of increasing the loss of thorium to the aqueous phase during solvent extraction.

For short-decayed material a sulfite or bisulfite concentration within the range of 0.02 to 0.2 M may be employed, and an initial concentration of approximately 0.06 M is preferred. This allows for an initial destruction of a 0.02 to 0.03 M portion of these ions as a result of radiation, with a concentration of 0.03 to 0.04 M remaining to be effective during the extraction operation.

In order to obtain further ruthenium decontamination it is also preferred to employ sulfite or bisulfite ions in the aqueous aluminum nitrate scrub solution for both long and short-decayed material. Since the ruthenium in the scrubbing operation is initially in the organic phase, no preliminary contacting treatment of the scrub solution with the sulfite or bisulfite is required. The sulfite or bisulfite is merely added to the scrub solution, which is then contacted with the organic phase. A sulfite or bisulfite concentration within the range of 0.02 to 0.06 M may be employed with approximately 0.03 M being preferred. The scrubbing operation may suitably be effected at the ambient temperature normally employed in the absence of our sulfite or bisulfite treatment. However, somewhat better results are obtained at elevated temperatures and any temperature up to the decompositon temperature of the sulfite or bisulfite in the scrub solution may be employed if desired.

It is to be understood that the above-described process may be performed with a plurality of extraction and scrubbing cycles, with sulfite or bisulfite ions preferably being employed in each cycle.

Our invention is further illustrated by the following specific examples.

EXAMPLE I

A laboratory experiment was conducted to determine the effect of added sodium bisulfite on the separation of ruthenium from thorium. A feed solution was prepared to contain 190 grams of thorium per liter, 0.78 M aluminum nitrate, 0.1 M sodium bisulfite and ruthenium gamma radioactivity of $5 \times 10^6$ gamma counts per milliliter per minute. The nitrate ion deficiency of the solution was 0.3 N. The solution was heated for 5 minutes at 85° C. and cooled to 35° C. The solution was then agitated for 5 minutes and contacted with 5 volumes of 42 percent tributylphosphate in a kerosene type diluent. The phases were separated, and the organic phase was scrubbed with one-half volume portions of a 0.5 M aluminum nitrate solution having a nitrate ion deficiency of 0.15 N. A gross gamma count made immediately on the scrubbed organic phase showed an activity of only 42 counts per milliliter per minute. This corresponds to a ruthenium decontamination factor of at least $1.6 \times 10^4$. Control solutions without bisulfite showed decontamination factors of less than 100.

EXAMPLE II

A simulated long-decayed thorium feed solution was prepared to contain 1.5 M Th, 0.5 M Al, and about $10^6$ gamma counts per milliliter per minute of ruthenium. The acid deficiency was approximately 0.2 N. Varying amounts of sodium bisulfite were employed in different runs to determine the effect of bisulfite concentration on ruthenium decontamination. The bisulfite was added and the solution was allowed to stand for 5 days at room temperature. In each run the feed solution was stirred for 5 minutes with 42 percent tributylphosphate in a kerosene diluent and the organic phase was scrubbed six times with a 0.5 M aluminum nitrate solution. The results obtained are listed in the following table.

*Table I*

| NaHSO₃ Concentration (M) | Ru Decontamination Factor |
| --- | --- |
| 0 | 6.5 |
| 0.002 | 1,100 |
| 0.01 | 2,300 |
| 0.06 | 2,800 |

EXAMPLE III

Further runs were made using the procedure of Example II to determine the effect of added bisulfite on ruthenium decontamination in acid systems. With a 3 N acid feed solution there was no beneficial effect of bisulfite. With a 0.5 N acid solution a decontamination factor of 10 was obtained, compared to 4 for a control solution without bisulfite.

EXAMPLE IV

A pilot plant run was conducted to determine the effect of employing bisulfite for ruthenium decontamination of thirty-day decayed thorium, irradiated to a level of 4000 grams $U^{233}$ per ton of thorium. The thorium was dissolved in nitric acid, and the solution was adjusted to an aluminum nitrate concentration of 0.7 M and a nitrate ion deficiency of 0.15 M. Sodium bisulfite was added to produce an initial concentration of 0.01 M, and the solution was heated to slightly below 50° C. for 5 minutes. The feed solution was then contacted wtih tributylphosphate in a kerosene diluent and the organic phase was scrubbed with a 0.5 M aluminum nitrate solution having a nitrate ion deficiency of 0.15 N and a sodium bisulfite concentration of 0.03 M. Two extraction and scrubbing cycles were conducted. For the first cycle ruthenium decontamination factors averaged 8. In the second cycle the ruthenium decontamination factor was 280 for thorium and 1800 for uranium. These values are to be compared with ruthenium decontamination factors of only 2 to 3 for a single cycle without added bisulfite. This experiment was conducted at a temperature and bisulfite concentration slightly lower than optimum for the conditions employed, as may be seen from the following example.

EXAMPLE V

Experiments were conducted in a heavily shielded laboratory cell with the short-cooled thorium feed solution of Example IV under the same conditions, except for a higher bisulfite concentration and higher temperatures. Sodium bisulfite was added to produce a concentration of 0.06 M in the feed and the solution was heated to 58° C. instead of 50° C. before extraction. A ruthenium decontamination factor of 320 was obtained for thorium, as compared with 2.5 for a control sample without bisulfite.

It is to be understood that the above examples are merely illustrative and are not to be construed as limiting the scope of our invention, which is limited only as indicated by the appended claims. It is also to be understood that many variations in apparatus and procedure may be employed within the scope of our invention.

Having thus described our invention, we claim:

1. In a process for the separation of thorium and uranium from an aqueous nitrate feed solution containing said elements together with protactinium and fission products which comprises contacting said solution with an organic solvent and separating the resulting organic phase containing said thorium and uranium from the resulting aqueous phase containing said protactinium and fission products, the improvement which comprises providing in said feed solution ions selected from the group consisting of sulfite ions and bisulfite ions.

2. The process of claim 1 in which said ions are bisulfite ions.

3. In a process for the separation of thorium and uranium from an aqueous nitrate feed solution of neutron-irradiated thorium containing said elements together with protactinium and fission products which comprises adjusting said feed solution to nitrate ion deficient conditions, contacting said solution with an organic solution of tributylphosphate in a kerosene diluent, thereby preferentially extracting uranium and thorium into the resulting organic phase while confining protactinium and fission products to the resulting aqueous phase, scrubbing said organic phase with an aqueous solution of nitrate ion deficient aluminum nitrate and separating said protactinium and fission products-containing aqueous phase from said uranium and thorium containing organic phase, the improvement which comprises providing in said feed solution and said scrub solution ions selected from the group consisting of bisulfite ions and sulfite ions.

4. The method of claim 3 in which said ions are bisulfite ions.

5. The method of claim 4 in which the concentration of said bisulfite ions is within the range of 0.01 to 0.2 M.

6. In a process for the separation of thorium and uranium from an aqueous nitrate feed solution of neutron-irradiated thorium containing said elements together with protactinium and fission products which comprises adjusting said feed solution to nitrate ion deficient conditions, contacting said nitrate ion deficient solution with an organic solution of tributylphosphate in a kerosene diluent, thereby preferentially extracting uranium and thorium into the resulting organic phase while confining protactinium and fission products to the resulting aqueous phase, the improvement which comprises providing in said nitrate ion deficient feed solution ions selected from the group consisting of bisulfite ions and sulfite ions and maintaining the resulting solution containing said ions at a temperature within the range of approximately 60° C. to 90° C. and below the decomposition temperature of said ions in said solution for a time within the range of approximately 5 to 20 minutes.

References Cited in the file of this patent

Proceedings of The International Conference on the Peaceful Uses of Atomic Energy, August 8–20, 1955, vol. 9, pp. 505–510, 559–568. United Nations, New York.

UNITED STATES PATENT OFFICE
CERTIFICATE OF CORRECTION

Patent No. 2,909,406                                                      October 20, 1959

Albert B. Meservey et al.

It is hereby certified that error appears in the printed specification of the above numbered patent requiring correction and that the said Letters Patent should read as corrected below.

Column 2, line 62, after "irradiated thorium" insert the two following paragraphs:

> It is, therefore, an object of our invention to provide a method of improving uranium and thorium decontamination with respect to ruthenium in the extraction of uranium and thorium from a nitrate solution of neutron-irradiated thorium.
>
> Another object is to inhibit the extraction of ruthenium from a nitrate ion deficient nitric acid solution containing the same, together with thorium, uranium protactinium and fission products, into an organic solvent comprising tributyl-phosphate in a hydrocarbon diluent.

Signed and sealed this 31st day of May 1960.

(SEAL)
Attest:

KARL H. AXLINE                                                           ROBERT C. WATSON
Attesting Officer                                              Commissioner of Patents